United States Patent [19]

Atkinson et al.

[11] 4,315,520

[45] Feb. 16, 1982

[54] FLUID LEAKPORT ORIFICE STRUCTURE

[75] Inventors: Louis D. Atkinson, New Berlin; Wesley W. Rineck, Wauwatosa, both of Wis.

[73] Assignee: Airtrol Components, Inc., New Berlin, Wis.

[21] Appl. No.: 171,127

[22] Filed: Jul. 22, 1980

[51] Int. Cl.[3] .............................................. G05D 16/00

[52] U.S. Cl. ...................................................... 137/82

[58] Field of Search ........................ 137/82, 85, 86, 84

[56] References Cited

U.S. PATENT DOCUMENTS

| | | | |
|---|---|---|---|
| 2,426,970 | 2/1969 | Hedlund | 137/82 X |
| 3,662,779 | 5/1972 | Weber | 137/489 |
| 3,791,397 | 2/1974 | Janu | 137/82 |

*Primary Examiner*—Alan Cohan

*Attorney, Agent, or Firm*—Andrus, Sceales, Starke & Sawall

[57] ABSTRACT

A fluid signal comparator includes a flexible diaphragm clamped within a housing and defining a signal input chamber coupled to a signal source and an input/output chamber connected to an air supply and to a load. A leakport orifice unit includes a centrally located nozzle having a planar outer edge seat located in spaced parallel relation to the diaphragm. The diaphragm moves to create a pressure in the input/output chamber which balances the input signal force on the diaphragm. An output port is connected to the input/output chamber and to the load in the illustrated embodiment to transmit the pressure and/or flow to the load. The pressure of the input signal and of the stream acts on opposite sides of the diaphragm and positions the diaphragm relative to the orifice seat to create a restricted flow passageway having the necessary pressure drop to create a balanced pressure condition in the output chamber. The sealing land or seat of the nozzle includes a plurality of circumferentially distributed dished notches which break the planar sealing surface presented to the diaphragm and establish offset auxiliary flow paths within the restricted gap. The notches are of different cross-sectional areas and function to stabilize modulating movement of the diaphragm and essentially eliminate vibration of the diaphragm to produce a stable and audible-free pressure signal.

11 Claims, 5 Drawing Figures

FIG. 1
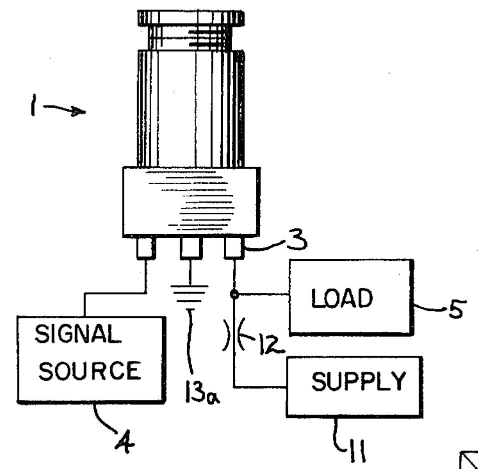
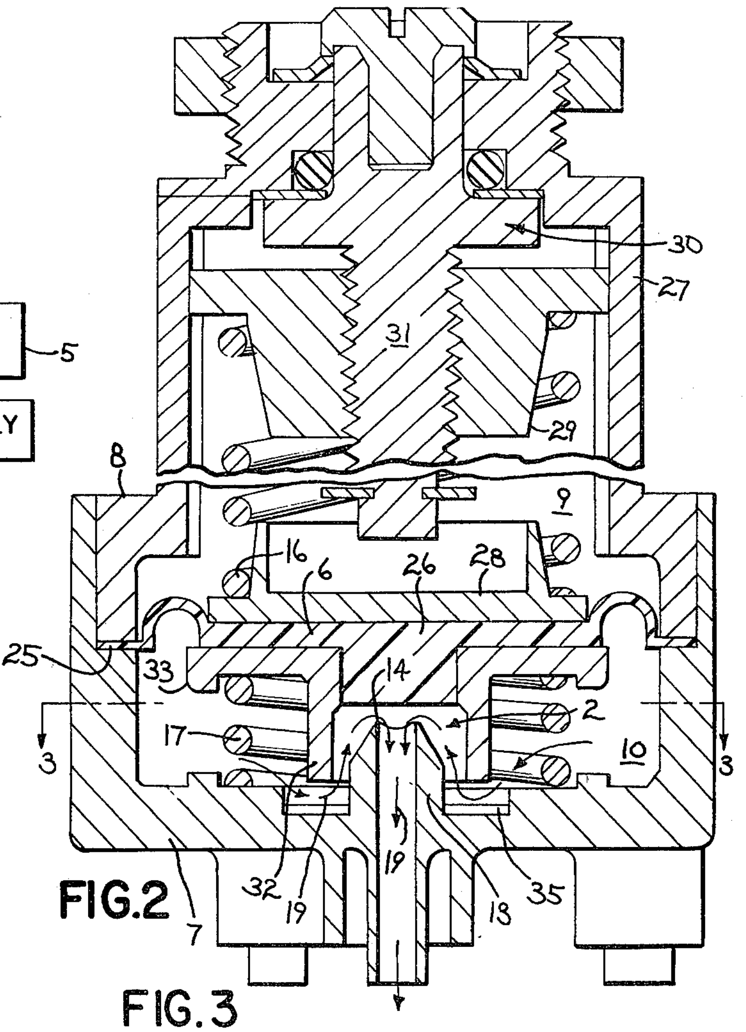
FIG. 2
FIG. 4
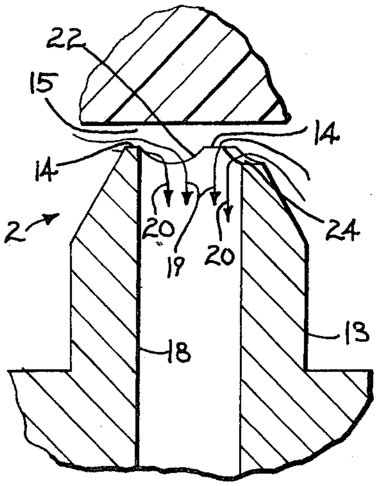
FIG. 3
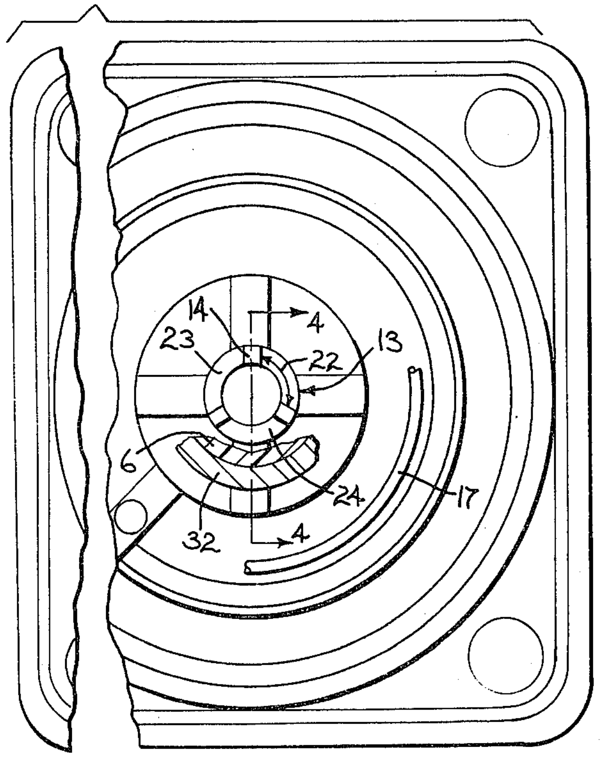
FIG. 5
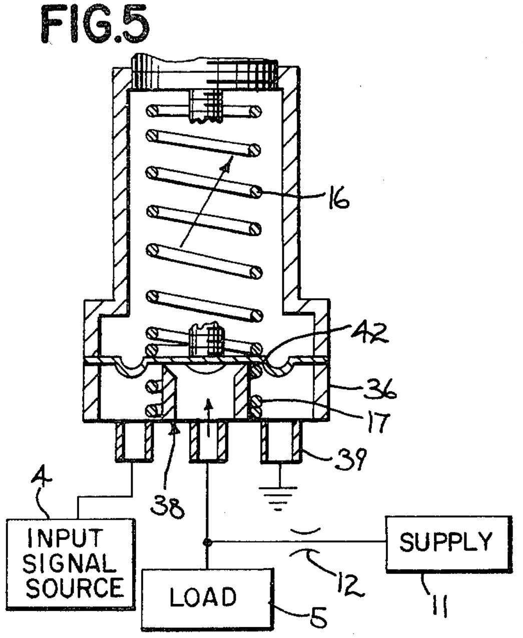

FLUID LEAKPORT ORIFICE STRUCTURE

BACKGROUND OF THE PRESENT INVENTION

The present invention relates to a fluid orifice structure and particularly to an orifice structure having a modulating closure means for varying a pressure signal supplied by the orifice.

In fluid control and operating systems, a signal nozzle device, in combination with control closure structures produce a proportional pressure signal device. In such devices, the closure member is moveably mounted in overlying relationship to the nozzle orifice, thereby controlling the amount of fluid flow through the orifice and correspondingly adjusting the pressure drop across the orifice. By varying the position of the control means, a variable signal is developed which can be used as a control or operating signal. The closure member may be in the form of a canilevered leaf spring element, a flexible diaphragm or the like. Thermostatic devices and other condition sensitive back pressure sensors, for example, may include a bimetal leaf spring element mounted to variably close an orifice, thereby generating a back pressure upstream of the orifice in accordance with a sensed condition. Other fluid and particularly pneumatic devices include fluid signal comparators, amplifiers, switches and like devices in which a flexible diaphragm is sealed within a housing in overlying relationship to an orifice. The diaphragm separates the unit into the signal input chamber, which may or may not include a bias spring, and an input/output chamber which includes the leakport orifice and at least one other port to establish flow into and from the chamber with the flow controlled by the opening and closing of the orifice. These and similar devices are not only well known, having been used for many years, but are relatively highly developed devices providing high degrees of accuracy and response. Further, signal controlling diaphragm devices are relatively simple and readily commercially mass produced.

However, as is well known, signal instability may occur as the closure member moves into relatively close spacement to the orifice. Thus, when supply pressure is supplied to the orifice, the stream issuing from the orifice is of course controlled by the position of the enclosure member. As the closure member moves into close spacement to the orifice, a vibration of the closure member is often created. The vibration is related to and dependent upon the particular spacing of the closure member with respect to the nozzle as well as the material of the closure member or lid and the like. Thus, at a particular balance position, the air moving through the relatively small gap between the lid and orifice tends to create suction with a corresponding reduction in pressure to the downstream side of the orifice. The result is a pressure buildup on the upstream side of the orifice and the closure member tends to move from the orifice to balance and offset such characteristic. This in turn reverses the pressure conditions and the closure member then tends to move toward the orifice. This of course will be recognized as an unstable state, resulting in vibration of the closure member. The member vibrates at a fundamental vibrating frequency related to the dynamics of the air movement and the physical characteristics of the elements. This latter movement not only creates an unstable pressure signal condition, but may well result in a very distinct audible noise. Methods have been suggested for minimizing the vibrational effect. A conventional method is the weighting of the closure member to dampen vibrations. This however reduces the sensitivity of the closure member to the closing force, such as a temperature condition in a bimetal element. U.S. Pat. No. 3,426,970, which issued Feb. 11, 1969, discloses a flat ended nozzle structure with a special encircling structure for developing an air cushion between the lid and a spaced surface exterior to the nozzle which tends to dampen the vibrational characteristics of the flapper or closure member. Such structure would be restricted to a system wherein the air supply is coupled to the orifice such that an emitting jet is created which also interacts with the interrelated surrounding physical structure to develop the desired air cushion.

There is therefore a need for a generally universal means and structure to eliminate such vibrational characteristic and noise in a fluid signal orifice unit, which must of course be adapted to practical commercial implementation.

SUMMARY OF THE PRESENT INVENTION

The present invention is particularly directed to a fluid signal orifice structure having a means incorporated into the opposing sealing surfaces of a nozzle and the closure member which produces a controlled leakage therebetween in such a construction and arrangement so as to eliminate vibrational conditions in a leakport-type orifice structure. Generally in accordance with the present invention, the controlled leakage disrupts the flow characteristic to minimize or compensate for the suction conditions, thereby essentially eliminating conditions generating vibrational response of the closure member. In accordance with the teaching of the present invention, the closure member and opposed outer most end of the orifice are specially constructed such that a leakage path is maintained as the closure member moves into a sealing engagement with the outer orifice edge and with the leakage path forming a progressively increasing proportion of the total flow. Such controlled leakage can be provided in various ways. A particularly satisfactory and unique embodiment includes a sharp ended planar orifice having a plurality of circumferentially distributed minor edge notches and located in opposed parallel relation to a generally flat closure member. By appropriate sizing of the notches, the vibrational and noise of the conventional nozzle structure is eliminated regardless of the flow direction with respect to the orifice. Thus, the device operates with a positive or negative pressure applied to the orifice. Generally, a minimal flow is created under all conditions. However, by selection of a material of a suitable durometer, a total seal can of course be created by deformation of the lid member to fill such notches.

The result is a stable output pressure which is free of audible noise or the like. The signal orifice can of course be used in any pneumatic or other fluidic control or operating system whether a vacuum or positive pressure system. The present invention in this aspect of the invention is particularly directed to practical mass production of a molded nozzle structure in which the individual port can be readily molded with the necessary notched construction. Injection molding plastic processes are such that a high degree of repeatability can be obtained. As a result, a series of nozzles having the same accuracy and repeatability of the signal characteristic can be provided.

Other structural means of forming the controlled leakage, within the broadest implementation of the teaching of the present invention, may be provided such as the use of a particular resilient rubber-like material which deflects in response to the emitting air jet to create the special leakage characteristics. The leakage spacing can of course be created by appropriate nozzle projections tending to prevent the normal movement of the sealing media in a constant planar position with respect to the orifice. In fact, the sealing or closure member may be formed as a grooved member or even as a series of telescoping, sealing elements mounted for successive movement toward the nozzle.

The present invention thus provides a relative simple, stable leakport orifice structure which is adapted to commercial production with well known manufacturing technique and which produces a stable output signal and particularly a signal which has a minimal or no vibrational characteristic.

DESCRIPTION OF THE DRAWING FIGURES

The drawing furnished herewith illustrates a preferred construction of the present invention in which the above advantages and features are clearly disclosed as well as others which will be readily understood from the following description.

In the drawing:

FIG. 1 is a pictorial view of a fluid comparator connected in a typical fluidic system;

FIG. 2 is a vertical section of a spring biased diaphragm comparator;

FIG. 3 is a horizontal section taken generally on line 3—3 of FIG. 2 and with parts broken away and sectioned to more clearly illustrate detail of construction;

FIG. 4 is an enlarged fragmentary view of the nozzle shown in FIGS. 2–3 and taken generally on broken line 4—4 of FIG. 3; and FIG. 5 illustrates an alternate embodiment of the invention.

DESCRIPTION OF THE ILLUSTRATED EMBODIMENTS

Referring to the drawing and particularly to FIGS. 1–4, a spring biased fluid signal comparator 1 is illustrated including a leakport orifice unit 2 constructed in accordance with the teaching of the present invention. The comparator 1 is shown interconnected as a back pressure sensor for developing an output signal pressure at a signal port 3 which is proportional to an input signal from a suitable signal pressure source 4. The illustrated embodiment is described with a pneumatic signal source 4 connected to the comparator 1 to develop a pneumatic output signal at signal port 3 for operating of a suitable air operated load 5. The illustrated comparator 1, as shown in FIG. 2, is generally a known type of a diaphragm device having a flexible diaphragm 6 formed of a suitable flexible rubber-like material clamped within a housing or body having a cup-shaped base 7 and by an outer or closure member 8. The diaphragm 6 divides the housing into a signal input chamber 9 coupled to the signal source 4 and a supply or input/output chamber 10 connected to an air supply or source 11 through an orifice 12 and to port 3. The input/output chamber 10 includes the leakport orifice unit 2 with the diaphragm 6 forming a closure member. The unit 2 particularly includes a centrally located nozzle 13 having a planar outer edge seat or land 14 located in spaced parallel relation to the closure portion of diaphragm 6 to form a restricted flow gap or passageway 15 therebetween. Nozzle 13 is connected to a reference pressure shown as atmosphere by the usual ground symbol **13*a*. The air from source 11 then flows into and from chamber 10 through restrictor passageway 15 and nozzle 13 to atmosphere 13*a*. As the diaphragm 6 moves toward or away from the edge land 14, the restricted flow gap or passageway 15 therebetween changes accordingly and results in a change in the pressure drop across the nozzle. A bias spring 16 is shown in the signal input chamber 9 which biases the diaphragm 6 into preselected engagement or close spaced relation to the nozzle edge 14 in the absence of an input pressure signal. The input signal pressure is added to the force of spring 16. A spring 17 may also be placed in the input/output chamber 10 to introduce a constant opposing force to the opposite side of the diaphragm 6 creating a negative force or tending to balance the signal source or adjustable spring force in the input chamber 9. The diaphragm 6 moves to create a pressure in the input/output chamber 10 which with the spring force of spring 17 balances the input signal pressure and the force of spring 16 in the input chamber 9. The output port 3 is connected to the output chamber 10 and to the load 5** in the illustrated embodiment to transmit the pressure and/or flow to the load, which may be any fluidic responsive load including a dead ended load of a flow consuming load.

In operation, the pressure of the supply stream in chamber 10 forces the diaphragm 6 away from the orifice seat 14 to create a restricted flow passageway 15 having the necessary pressure drop to create the balancing signal pressure in the output chamber 10. The diaphragm 6 is positioned to maintain this equalized pressure condition. In the illustrated embodiment, the orifice 18 in nozzle 13 is of an inconsequential area as more fully developed hereinafter and the opposite sides of the diaphragm are of essentially equal area, such that the device functions to provide a one-to-one balance between the input and output pressure signal, with an offset in accordance with the spring forces.

The device may of course be constructed to function in any other usual or desired leakport device such as an adder, a subtractor, a pressure regulator, as well as a pressure switch. In such system, the input supply and output connection will be changed as required.

Generally, such diaphragm devices and the system connections including the load are known and no further description of the functional operation is given other than to clearly describe the arrangement and structure of the nozzle and diaphragm to obtain the new result of the present invention; namely, a stable output pressure over the total range of diaphragm movement up to and including engagement with the nozzle.

The jet stream 19, as it flows through the gap 15 between the sealing edge 14 and the diaphragm 6, generates a dynamic pressure condition which may cause instability in positioning the diaphragm to balance the input signal pressure. Thus, as the diaphragm 6 moves closer and closer to the orifice, the outer flow portion 20 of the jet stream 19 may tend to evacuate the area at the diaphragm central portion 21 aligned with orifice 18. At a certain position or positions of the diaphragm 6, the dynamic pressure conditions caused by the jet stream 20 flowing between the diaphragm 6 and the sealing edge land 14 may develop a relative vacuum or suction force or condition on the central portion 21 of the diaphragm 6. This pressure condition would tend to cause the diaphragm to move toward the nozzle 13 resulting in a changed or reduced pressure drop which causes a pressure build up in chamber 10. The supply input/output pressure in chamber 10 thus builds to move the diaphragm 6 outwardly. As a result of such outward movement, the suction condition is disrupted and a reduced pressure created in the output chamber 10, causing the signal source 3 to be unbalanced, and in turn, causing the diaphragm 6 to move toward the nozzle 13. The cycle then begins to repeat.

The overcompensation and reset movement of the diaphragm 6 develops a vibrational frequency, which at particular positions of the diaphragm results in a modulated or varying signal and which often generates distinct audible frequencies or noise. The output pressure signal is thus a relatively unstable signal and in many applications such instability may be of a level which may not be tolerated or acceptable. The noise generated by such a unit will generally be unacceptable is personnel must be in the vicinity of the unit. In accordance with the teaching of the present invention, the gap between the nozzle sealing face or edge 14 and the diaphragm 6 is arranged and constructed to minimize and essentially eliminate the creation of a diaphragm vibrational condition by maintaining an auxiliary flow path with the restricted flow passageway, and in which the flow area of the auxiliary flow path as a percentage of the total flow path through the gap progressively increases as the diaphragm 6 approaches the nozzle.

In the illustrated embodiment of the invention, the nozzle 13 is shown as a generally tubular member having an outer chamfered edge terminating in a small flat sealing face or land 14. The sealing face may be minimal in width but preferably is of a sufficient width to prevent the forming of a sharp cutting edge. The outer sealing face, in accordance with this embodiment of the present invention, is specially constructed with the plurality of circumferentially distributed cutout areas or notches 22, 23 and 24 which break the planar sealing surface presented to the diaphragm. The notches 22–24 thus establish an offset auxiliary flow path within the restricted gap 15. With a proper construction and arrangement of the plurality of notches, the inventors have found that the unwanted modulating vibrational movement of the diaphragm is essentially completely eliminated and a stable output pressure directly related to a constant stable position of the diaphragm is obtained. The proper construction and arrangement of the nozzle notches or such other means as are provided within the scope of the invention appear to significantly minimize the effect heretofore created by vacuum conditions normally generated within the emitting stream by internal balancing of the dynamic conditions and characteristic such that a stable and audible-free signal is obtained. Thus, although the number, size, shape and the like of the notches are not critical, such factors are significant to an optimum functioning structure. Thus, the inventors have discovered that a plurality of notches are preferred and that the depth of the notches should be of different depths for optimum results.

The illustrated comparator provides a convenient modular structure in which the gain may be raised by changing the base structure as more fully described hereinafter. Thus, the illustrated embodiment includes the cup-shaped base 7 having an annular ledge 25. The convoluted diaphragm 6 is formed of a suitable rubber-like material is located with the outer edge abutting the ledge 25, and with a central enlargement 26 projecting toward and into spring-loaded engagement with the sealing land 14 of nozzle 13. Member 8 includes an outwardly extending tubular input housing 27 secured within the base 7 in clamping and edge sealing engagement with the outer periphery of the diaphragm 6 and seals the diaphragm to the ledge 25. A spring guide 28 is located abutting the back side of the diaphragm 6 to support the bias spring 16. An outer spring guide 29 is adjustably mounted within the outer end of the tubular housing 8. The outermost end of the housing 27 is sealed by a rotatably mounted sealing cap 30. A threaded rod 31 extends inwardly from the cap through a threaded opening in the outer spring guide 29 whereby rotation of cap 30 moves the guide 29 axially along the rod to compress the spring 16. The T-shaped spring guide 32 includes a base portion 33 held within the chamber 10 in engagement with the underside of the diaphragm 6 within the convoluted portion and a stem projecting in close fitting relationship over the enlargement 26 and an enlarged diameter portion telescoped down over the nozzle 13. The spring 17 acts between the base wall and the guide 32 to bias the diaphragm 6 outwardly. The base wall of the base is notched as at 35 in alignment with the guide to maintain fluid communication around the stem of the guide 32 if the stem moves downwardly into engagement with the base wall.

A practical comparator such as illustrated in FIGS. 1–5 was constructed in which the nozzle had an outer diameter of 0.14 inches and orifice 18 had a diameter of 0.086 inches at the sealing land 14. A 60° chamfer on the nozzle end provided a sealing land having a width of a couple of thousands of an inch. Three equicircumferentially spaced notches 22–24 were provided in the sealing land. Notch 22, 23 and 24, respectively, had a depth of essentially 0.005, 0.006, 0.007 inches and each was formed as a smooth concave notch having a radius of 0.078 inches. A rubber-like diaphragm 6 was mounted in fixed relationship overlying the orifice and generally spaced therefrom by 0.010 inches. The comparator of this particular construction has been used with input signal pressures of 0.01 PSI to 50 PSI and with a supply pressure of 50 PSI connected to chamber 10 in series with a 0.007 inch restrictor 12. The output was varied from zero to 50 PSI with a stable, noise free output.

The described embodiment provided a 1 to 1 gain characteristic, which may of course be changed by changing the relative operative areas of the diaphragm in the input chamber and the input/output chamber. Thus, changing the size of the nozzle and orifice provides a convenient means of changing the gain. Thus, if the cross-sectional area of the nozzle orifice is significantly increased the effective or operative area of the diaphragm in chamber 10 is reduced as the diaphragm moves to the flow restricting position. For example, if the orifice area is $\frac{1}{3}$ the diaphragm area, a three to 1 gain characteristic results.

The inventors have constructed nozzles similar to that shown in FIG. 2 with different orifice diameters to produce components with a positive gain and particularly with a 3 to 1 gain and another with a 5 to 1 gain.

A positive gain unit is shown in FIG. 5, wherein the connections to the supply and reference are changed. Thus, the structure of FIG. 5, which is diagrammatically illustrated, may essentially correspond to FIGS. 1–4 but has a different base unit 36. A restricted supply connection 37 is made to the nozzle orifice 38 and the load 5 is connected between the orifice 38 and the supply orifice 12. The port 39 to the chamber 40 is now connected to reference or atmosphere as at 41. The supply pressure now is applied over the cross-sectional area of the orifice 38 to the aligned portion of the diaphragm 42. With this area ⅓ of the total diaphragm area, the output pressure must rise to three times the level of the input pressure to balance the pressures acting to the opposite side of the diaphragm 42. The output pressure appearing at the load connection is correspondingly three times the input pressure and the unit has a gain of three. In a 3 to 1 gain structure, the nozzle had a sharp edge land formed by an inner 45° chamfer to define an orifice sealing diameter of 0.410 inches. Six notches were provided in the edge land. Each notch was formed with 0.625 inch cutter to a depth of 0.0025 inches. However the depths may advantageously be of a staggered depth as in the first embodiment. In a 5 to 1 ratio design a nozzle similar to that of the first embodiment was formed with an internal diameter of 0.305 inches and with six notches equicircumferentially spaced of the same size as in the 3 to 1 design.

In still other embodiments, other dimensional relationships may of course provide the desired result. Generally, the width and depth of the notch are inversely related. Thus, if a relatively wide notch is employed, it will be found that the notch may also be relatively shallow. Although no particular formulation would appear to define the exact notch relationship, the particularly number, the depth and width can be readily determined by appropriate, straight forward modifying of a nozzle structure with different numbers and shaping the notches.

As described, the notches 22 tend to establish a continuous flow through the nozzle. In certain applications a complete sealing of the orifice may be desired or required. This can be readily obtained by providing a diaphragm, at least in the seal area, with a sufficient durometer softness such that the diaphragm is deflected into the several sealed notches by the input pressure and effectively close the notches and completely seal off the orifice. In such an arrangement it is of course highly desirable to use relatively wide shallow notches. Such sealing will not interfere with the vibration elimination concept of the present invention because the diaphragm has moved into engagement with the nozzle seat land prior to the final sealing. The engagement creates frictional interengagement which will dampen and prevent vibrational movement of the diaphragm. Thus, once the diaphragm has moved into substantial closing engagement, the necessity for the notches is minimized or eliminated.

Although shown as a notched construction in a planar seat or land, a similar appropriate effect may be obtained in other structures. For example, provision of suitable projections on the orifice face may in affect define small gaps or notches. External projections or pegs immediately adjacent to the periphery or even spaced outwardly of the nozzle may, during the closure movement, hold an outer portion of the diaphragm from the nozzle and cause the diaphragm to move to a concave position as it approaches the sealing land of the nozzle. As the result, there will be an offsetting relationship between the nozzle and the outer sealing ring of the diaphragm which may effectively simulate the auxiliary flow path created in the notch type construction and thereby removes the vibrational creating condition associated with a conventional diaphragm. In this aspect of the teaching a very soft sealing material, such as a sponge like material having suitable air passageways therein, may even be used to in essence produce the desired continuous leakage flow. A similar result can of course be obtained by employing a diaphragm which has a series of parallel convolutions such that as the diaphragm moves downwardly into sealing engagement with the nozzle the convolutions overlying the nozzle establish external flow paths with the desired compensation. A closure member may include a plurality of immediately adjacent telescoping control plates which move successive plates toward and away from the sealing position with respect to a nozzle. The control member thus produces a closure of the orifice while maintaining a controlled flow from the orifice which can be arranged and constructed in such a manner as to prevent adverse vibrational movement of the plates and therefore of the lid as a unit.

Thus, generally the present invention teaches that by proper establishment of a controlled leakage condition during the close approach into sealing engagement, the Bernoulli effect and the interrelated pressure forces may be balanced and essentially eliminated from the dynamic characteristic of the leakport type orifice.

The present invention particularly with the molded notched orifice, has been found to provide a highly effective leakport unit with essentially no noise characteristics and particularly adapted to commercial production. The output of the leakport unit is very stable and thereby provides an accurate, reliable and repeatable fluid signal, and the unit such as the illustrated spring-biased biased diaphragm comparator or similar leakport unit provide a versatile control fluid circuit component.

Various modes in carrying out the invention are contemplated as being within the scope of the following claims, particularly pointing out and distinctly claiming the subject matter which is regarded as the invention.

We claim:

1. A leakport orifice apparatus for generating a stable fluid signal comprising a nozzle member having an outer seat land of a substantially flat continuous configuration, a closure member having a closure surface mounted in overlying relationship to the seat land and relatively movable with respect to such seat land for variably adjusting the flow passageway between the closure member and nozzle and thereby throttling the fluid passing between the nozzle and the closure member and said closure member being capable of vibrational movement with respect to the nozzle, and means mounting said closure member for relative movement to and from the seat land, said seat land and said closure member being constructed and arranged to establish and maintain an auxiliary flow path in addition to and external to said restricted flow passageway between the seat land and the closure member, said auxiliary flow passageway external to said restricted flow passageway being selected and constructed to compensate for vibration forces generated by the jet stream passing between the orifice and the closure member.

2. A leakport apparatus comprising a closed body member, a flexible rubber-like diaphragm secured within said closed body member and defining a planar member dividing the body member into an input signal chamber and into an input/output chamber, a nozzle secured terminating within said input/output chamber with an outer flat sealing land located in opposed parallel relation to said diaphragm to define a selected control gap of a predetermined equal length around the nozzle, a separate port connected to said input/output chamber and in spaced relation to said nozzle, means for moving said diaphragm into engagement with said seat land of said nozzle, and said diaphragm and said sealing land being constructed relative to each other to define an auxiliary flow passageway with respect to said control gap at preselected portions around the nozzle in response to movement of the diaphragm, said auxiliary air flow passageway being selected and constructed to compensate for vibration related pressure conditions created within the stream between the nozzle and the diaphragm with the diaphragm located in a predetermined minimum spaced position from said nozzle.

3. The apparatus of claim 2 wherein said nozzle has an outer planar surface including a plurality of circumferentially distributed notches.

4. The apparatus of claim 2 wherein said nozzle including a plurality of circumferentially spaced notches each of said notches being of a concave construction and having a depth to width ratio selected to compensate for said vibration related pressure distribution in the jet stream flowing between said input/output chamber and said nozzle orifice and thereby generating a stable signal.

5. The apparatus of claim 4 wherein said nozzle has a discharge orifice of approximately 0.086 inches, said seal seat land incuding three of said notches, each of said notches having a different depth formed with a common radius of substantially 0.078 inches, one said notches having a depth of substantially 0.005 inches, a second of said notch having a depth of substantially 0.006 inches and a third of said notches having a depth of substantially 0.007 inches.

6. The apparatus of claim 4 wherein each of said notches has a different depth.

7. A modular fluid diaphragm comparator comprising a cup-shaped base member having a centrally located nozzle extending into the cup-shaped base member and terminating in an outer seat land, a diaphragm means located within said cup-shaped base member and in generally parallel spaced relation to said seat land, an outer closure input chamber member secured to the cup-shaped member and sealing the periphery of said diaphragm within said cup-shaped member whereby said diaphragm defines an input/output chamber to the nozzle side of the diaphragm and an input signal chamber to the closure member side of the diaphragm, said diaphragm having a central nozzle closure portion substantially larger than said nozzle and adapted to control different diameter nozzles, a spring means located within said input chamber, adjustment means for varying of the pressure of said spring means and therefore a bias on the diaphragm urging the diaphragm closure portion toward the seat land, said seat land being provided with a plurality of equicircumferentially distributed concave notches.

8. The diaphragm comparator of claim 6 wherein said nozzle has a discharge orifice of approximately 0.086 inches, said seal seat land including three of said notches, one each of each of said notches having a depth of essentially 0.005, 0.006, 0.007 inches and all notches having a radius of 0.078 inches.

9. The apparatus of claim 7 wherein said diaphragm is formed of a low durometer material and operable to first move into engagement with said seat land and thereafter movable into said notches to completely seal said nozzle.

10. A pneumatic leakport orifice apparatus for generating a stable fluid signal comprising a nozzle member having an outer sealing land of a substantially flat continuous configuration, a closure member mounted in overlying relationship to the seat land and movable with respect to such seat land for variably adjusting the flow passageway between the closure member and nozzle and thereby throttling the fluid passing between the nozzle and the closure member and being capable of vibrational movement with respect to the nozzle, and means mounting said closure member for movement to and from the seat land and movable in a direction essentially normal to the seat land, said seat land and said closure member being constructed and arranged to establish and maintain an auxiliary flow path in addition to the restricted flow passageway between the planar surface of the seat land and the planar surface of the closure member, said increased flow passageway being external to said restricted flow passageway and being constructed and arranged to compensate for vibration forces generated by the jet stream passing between the nozzle orifice and the closure member.

11. The method of generating a stable pneumatic fluid signal wherein a nozzle structure includes an orifice and a seat land located in opposed relation to a closure member to define a throttling gap therebetween and wherein said nozzle has a plurality of offset and outwardly projecting portions defining notches through said seat land between said outwardly projecting portions, comprising establishing a signal flow across said seat land between the nozzle structure and closure member and through said orifice, adjusting the position of said closure member and said seat land relative to each other to vary the size of said throttling gap and thereby to vary the pressure drop across said gap, establishing said flow in said gap in relation with said closure member and to said notches to eliminate unstable pressure condition in flowing fluid through the gap and thereby preventing creation of vibration forces on said closure member.

* * * * *

UNITED STATES PATENT AND TRADEMARK OFFICE
CERTIFICATE OF CORRECTION

PATENT NO. : 4,315,520

DATED : February 16, 1982

INVENTOR(S) : LOUIS D. ATKINSON and WESLEY W. RINECK

It is certified that error appears in the above-identified patent and that said Letters Patent are hereby corrected as shown below:

| | | |
|---|---|---|
| Column 1, | Line 19, | After "of a" cancel "canilevered" and substitute therefore --- cantilevered ---; |
| Column 1, | Line 46, | After "of the" cancel "enclosure" and substitute therefore --- closure -- |
| Column 7, | Line 28, | After "the" cancel "particularly" and substitute therefore --- particular ---; |
| Column 7, | Line 55, | After "in" cancel "affect" and substitute therefore --- effect ---; |
| Column 8, | Line 31, | After "spring-biased" cancel "biased"; |

UNITED STATES PATENT AND TRADEMARK OFFICE

CERTIFICATE OF CORRECTION

PATENT NO. : 4,315,520

DATED : February 16, 1982

INVENTOR(S) : LOUIS D. ATKINSON and WESLEY W. RINECK

It is certified that error appears in the above-identified patent and that said Letters Patent are hereby corrected as shown below:

Column 8, Line 59, CLAIM 1 — After "the" cancel "orifice" and substitute therefore --- nozzle ---;

Column 9, Line 23, CLAIM 4 — After "nozzle" cancel "orifice";

Column 10, Line 35, CLAIM 10 — After "nozzle" cancel "orifice".

Signed and Sealed this

***Thirty-first* Day of *August 1982***

[SEAL]

*Attest:*

GERALD J. MOSSINGHOFF

*Attesting Officer* *Commissioner of Patents and Trademarks*